(12) United States Patent
Wang et al.

(10) Patent No.: US 11,201,510 B2
(45) Date of Patent: Dec. 14, 2021

(54) METHOD AND DEVICE FOR CONTROLLING WIRELESS CHARGING

(71) Applicant: Beijing Xiaomi Mobile Software Co., Ltd., Bejing (CN)

(72) Inventors: Yanteng Wang, Beijing (CN); Zhijie Li, Beijing (CN); Chunli Xu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 323 days.

(21) Appl. No.: 16/384,357

(22) Filed: Apr. 15, 2019

(65) Prior Publication Data

US 2019/0319496 A1 Oct. 17, 2019

(30) Foreign Application Priority Data

Apr. 11, 2018 (CN) .......................... 201810322306.7

(51) Int. Cl.
*H02J 50/90* (2016.01)
*G06F 9/30* (2018.01)
(Continued)

(52) U.S. Cl.
CPC ............ *H02J 50/90* (2016.02); *G06F 9/3004* (2013.01); *H02J 50/10* (2016.02); *H02J 50/12* (2016.02); *H02J 50/80* (2016.02)

(58) Field of Classification Search
CPC ....................................................... H02J 50/90
(Continued)

(56) References Cited

U.S. PATENT DOCUMENTS

2015/0278038 A1* 10/2015 Halker .................. B60L 53/126
714/3
2017/0338682 A1* 11/2017 Yuan ....................... H02J 50/10

FOREIGN PATENT DOCUMENTS

| CN | 105958658 A | 9/2016 |
|----|-------------|--------|
| CN | 107154685 A | 9/2017 |

(Continued)

OTHER PUBLICATIONS

First Office Action issued to Chinese Patent Application No. 201810322306.7 dated Mar. 11, 2020 with English translation, (20p).

(Continued)

*Primary Examiner* — Edward Tso
*Assistant Examiner* — Ahmed H Omar
(74) *Attorney, Agent, or Firm* — Arch & Lake LLP

(57) ABSTRACT

A method and a device for controlling wireless charging are provided. The method includes: acquiring charging quality of a wireless charging receiver at a current position relative to a wireless charging transmitter; acquiring charging qualities of the wireless charging receiver respectively at the first and second preset positions; determining relative position information of the wireless charging receiver relative to the wireless charging transmitter, based on the charging qualities at the current position, and at the first and second preset positions; acquiring position correction information of the wireless charging receiver corresponding to the relative position information; and upon correction of a position of the wireless charging receiver based on the position correction information, charging the wireless charging receiver at the corrected position.

20 Claims, 9 Drawing Sheets

(51) Int. Cl.
*H02J 50/80* (2016.01)
*H02J 50/10* (2016.01)
*H02J 50/12* (2016.01)

(58) Field of Classification Search
USPC .......................................................... 320/108
See application file for complete search history.

(56) References Cited

FOREIGN PATENT DOCUMENTS

CN          107394908      * 11/2017   .............. H02J 50/40
CN          107394908  A     11/2017
WO       2015096997  A1      7/2015

OTHER PUBLICATIONS

Extended European Search Report of European Patent Application No. 19168468.7, dated Sep. 2, 2019, (73p).

* cited by examiner

| | | \multicolumn{13}{c}{OFFSET IN X DIRECTION} |
| | | -11 | -10 | -8 | -6 | -4 | -2 | 0 | 2 | 4 | 6 | 8 | 9 | 10 |
|---|---|---|---|---|---|---|---|---|---|---|---|---|---|---|
| | 10 | X | X | X | X | X | X | X | X | X | X | X | X | X |
| | 9 | X | X | X | X | X | 66.9% | 66.9% | 65.1% | X | X | X | X | X |
| | 8 | X | X | X | X | 68.1% | 72.1% | 72.9% | 71.7% | 67.2% | 63.9% | X | X | X |
| | 6 | X | X | 70.7% | 73.3% | 75.3% | 76.1% | 77.3% | 75.1% | 73.6% | 71.2% | X | X | X |
| OFFSET IN Y DIRECTION | 4 | X | X | 71.1% | 75.1% | 77.3% | 78.3% | 78.8% | 76.9% | 74.8% | 71.3% | X | X | X |
| | 2 | X | 71.7% | 74.8% | 76.8% | 77.4% | 80.0% | 80.1% | 78.9% | 77.1% | 74.2% | 69.0% | X | X |
| | 0 | X | 72.9% | 75.6% | 78.1% | 78.8% | 80.8% | 81.6% | 79.7% | 78.4% | 75.6% | 70.8% | 68.0% | X |
| | -2 | X | 72.8% | 75.8% | 77.1% | 77.8% | 80.5% | 80.2% | 79.2% | 76.7% | 74.1% | 68.7% | X | X |
| | -4 | X | 7.05% | 74.0% | 76.4% | 77.1% | 77.9% | 78.5% | 77.8% | 75.1% | 71.4% | 66.9% | X | X |
| | -6 | X | X | 70.7% | 73.0% | 75.6% | 76.3% | 77.1% | 76.0% | 73.8% | 70.2% | 63.7% | X | X |
| | -8 | X | X | X | 68.5% | 70.9% | 72.9% | 73.8% | 72.1% | 69.6% | 65.1% | X | X | X |
| | -9 | X | X | X | X | X | X | 68.6% | X | X | X | X | X | X |
| | -10 | X | X | X | X | X | X | X | X | X | X | X | X | X |

Fig. 1

METHOD AND DEVICE FOR CONTROLLING WIRELESS CHARGING

CROSS-REFERENCE TO RELATED APPLICATION

This application is based upon and claims priority to Chinese Patent Application No. 2018103223067 filed on Apr. 11, 2018, which is incorporated herein by reference in its entirety.

TECHNICAL FIELD

The present disclosure relates to the technical field of terminal device, and more particularly to a method and a device for controlling wireless charging.

BACKGROUND

Due to the efforts of wireless charging technology related manufacturers and coil manufacturers, wireless charging technology has begun to be applied in more and more smart devices, including many wearable devices and mobile smart terminals.

SUMMARY

The present disclosure provides a method and a device for controlling wireless charging.

According to a first aspect of the present disclosure, there is provided a method for controlling wireless charging. The method may include: acquiring a current charging quality of a wireless charging receiver at a current position relative to a wireless charging transmitter, the charging quality including coupling signal intensity or charging efficiency; acquiring a first charging quality of the wireless charging receiver at a first preset position relative to the wireless charging transmitter; acquiring a second charging quality of the wireless charging receiver at a second preset position relative to the wireless charging transmitter; determining relative position information of the wireless charging receiver relative to the wireless charging transmitter, based on the current charging quality at the current position, the first charging quality, and the second charging quality; acquiring position correction information of the wireless charging receiver corresponding to the relative position information; and upon correction of a position of the wireless charging receiver based on the position correction information, charging the wireless charging receiver at the corrected position.

According to a second aspect of the present disclosure, there is provided a device for controlling wireless charging. The device may include: a processor; and a memory for storing instructions executable by the processor. The processor is configured to: acquire charging quality of a wireless charging receiver at a current position relative to a wireless charging transmitter, the charging quality including coupling signal intensity or charging efficiency; acquire a first charging quality of the wireless charging receiver at the first preset position relative to the wireless charging transmitter; acquire a second charging quality of the wireless charging receiver at the second preset position relative to the wireless charging transmitter; determine relative position information of the wireless charging receiver relative to the wireless charging transmitter, based on the current charging quality at the current position, the first charging quality and the second charging quality; acquire position correction information of the wireless charging receiver corresponding to the relative position information; and upon correction of a position of the wireless charging receiver based on the position correction information, charge the wireless charging receiver at the corrected position.

According to a third aspect of the present disclosure, there is provided a non-transitory computer readable storage medium having stored thereon instructions that, when being executed by a processor, may cause the processor to perform acts including: acquiring charging quality of a wireless charging receiver at a current position relative to a wireless charging transmitter, the charging quality including coupling signal intensity or charging efficiency; acquiring a first charging quality of the wireless charging receiver at the first preset position relative to the wireless charging transmitter; acquiring a second charging quality of the wireless charging receiver at the second preset position relative to the wireless charging transmitter; determining relative position information of the wireless charging receiver relative to the wireless charging transmitter, based on the current charging quality at the current position, the first charging quality, and the second charging quality; acquiring position correction information of the wireless charging receiver corresponding to the relative position information; and upon correction of a position of the wireless charging receiver based on the position correction information, charging the wireless charging receiver at the corrected position.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

FIG. 1 is a schematic diagram showing charging efficiency according to an example;

DETAILED DESCRIPTION

Figure 2:
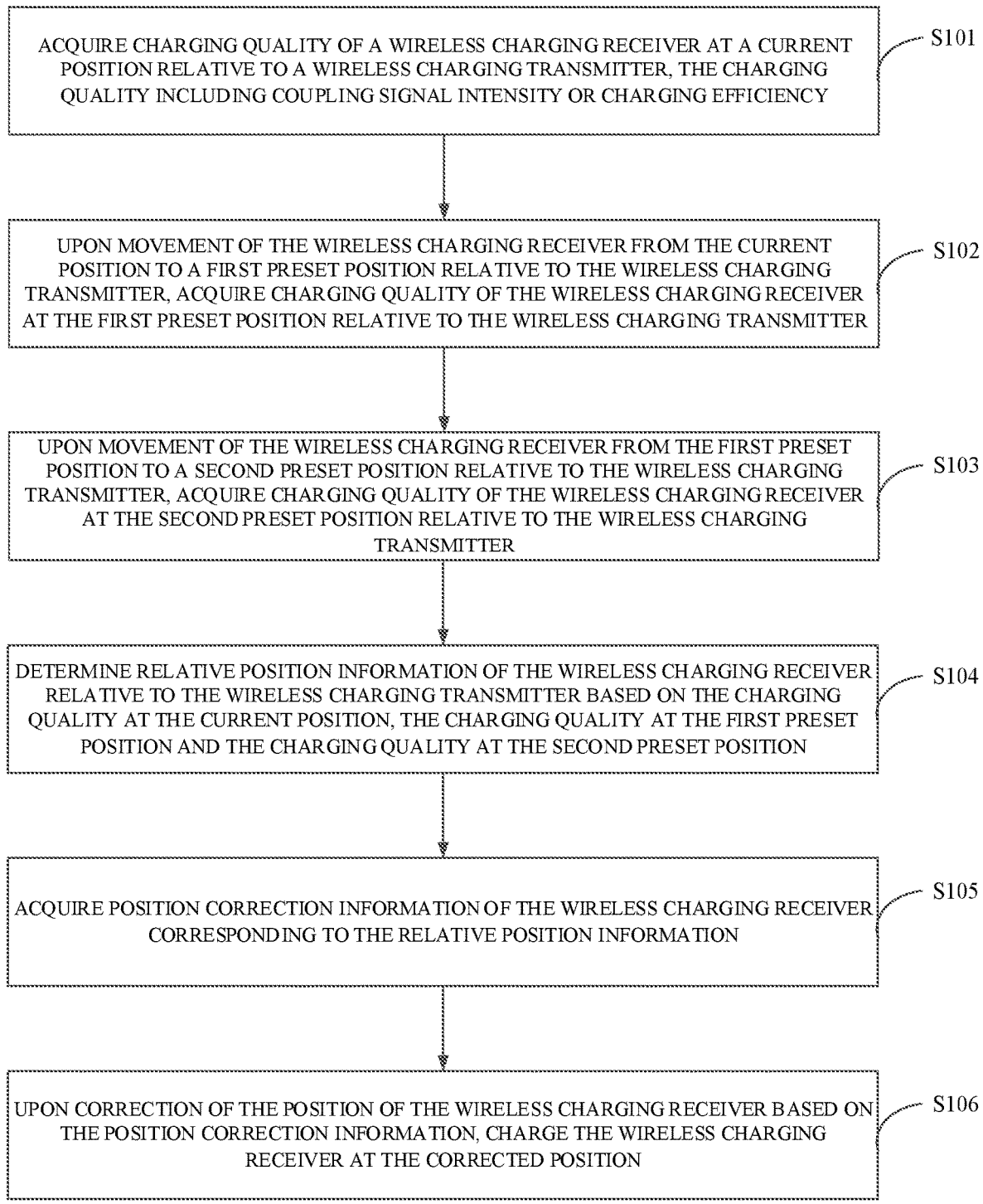
FIG. 2 is a flowchart showing a method for controlling wireless charging according to an example.

Reference is made in detail to exemplary aspects, examples of which are illustrated in the accompanying drawings. The following description refers to the accompanying drawings in which the same numerals in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It should be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Due to the efforts of wireless charging technology related manufacturers and coil manufacturers, wireless charging technology has begun to be applied in more and more smart devices, including many wearable devices and mobile smart terminals. At present, as far as the technology itself is concerned, there are mainly magnetic induction wireless charging technology taking WPC as a standard and magnetic resonance technology taking A4WP as a standard. Both these technologies have advantages and disadvantages. As far as the market is concerned, WPC has been widely used. In the mobile smart phone terminal market, the current WPC solution is dominant. When charging the mobile phone terminal using the wireless charging technology based on the Qi standard, it is necessary to align the wireless charging receiver coil and the wireless charging transmitter coil to achieve an optimal charging efficiency, such as about 84%.

However, if the wireless charging receiver coil of the mobile terminal and the wireless charging transmitter coil are not aligned, for example, if the wireless charging receiver coil and the wireless charging transmitter coil are offset in the X direction or the Y direction, the charging efficiency is significantly reduced. As shown in FIG. 1, which shows a test example, it can be seen that the charging efficiency gradually decreases with the offset in the X direction or the Y direction. When the offset is 10 mm or more, the charging is substantially stopped, and when the offset is within ±2 mm, the charging efficiency can be improved for achieving fast charging. In FIG. 1, zero offset in both the X and Y directions indicates that the wireless charging receiver coil is aligned with the wireless charging transmitter coil.

In order to improve the charging efficiency, for the wireless charging scheme using the WPC technology, generally, a center of the charging coil of the wireless charging transmitter and a center of the charging coil of the wireless charging receiver are aligned by adding a structural limiting means at the wireless charging transmitter, for example, by using a card slot or by means of magnet adsorption.

However, the alignment performed by the structural limiting means can only be used in designing particular wireless charging receivers and wireless charging transmitters. When using other wireless charging receivers and wireless charging transmitters, it is difficult to align the centers of the coils due to reasons such as the structures not matching with each other, thus failing to effectively realize fast charging.

The present disclosure discloses a method for controlling wireless charging. FIG. 2 is a flowchart showing a method for controlling wireless charging according to an example. As shown in FIG. 2, the method includes the following steps S101 to S106.

Step S101: acquiring charging quality of a wireless charging receiver at a current position relative to a wireless charging transmitter, the charging quality including coupling signal intensity or charging efficiency.

Taking charging quality being charging efficiency as an example, when the wireless charging receiver is placed at the wireless charging transmitter, the wireless charging receiver and the wireless charging transmitter perform the protocol interaction based on the Qi standard, and the wireless charging receiver is charged after the protocol communication is completed. In this case, the wireless charging receiver acquires the input voltage and current of the wireless charging transmitter, and acquires the current charging quality at the current position according to its own output voltage and current.

It should be noted that the method for acquiring the coupling signal intensity is the same as that in the related art, and details are not described herein.

Step S102: upon movement of the wireless charging receiver from the current position to a first preset position relative to the wireless charging transmitter, acquiring charging quality of the wireless charging receiver at the first preset position relative to the wireless charging transmitter.

Upon acquisition of the current charging quality at the current position, the user may, based on the first preset position relative to the wireless charging transmitter, move the wireless charging receiver to the first preset position relative to the wireless charging transmitter, and the corresponding first charging quality is acquired after the movement. In this case, the method for acquiring the charging quality is the same as the method for acquiring the current charging quality at the current position in step S101, and details are not described herein.

Figure 3:
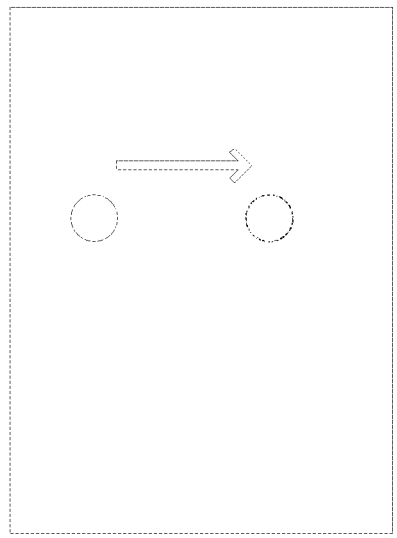
FIG. 3 is a schematic diagram showing a user interface according to an example.
Figure 4:
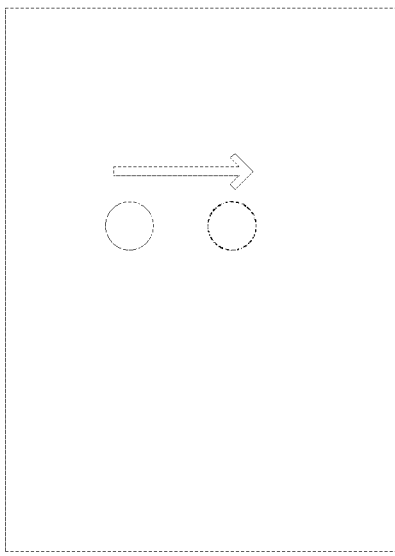
FIG. 4 is a schematic diagram showing a user interface according to an example.
Figure 5:
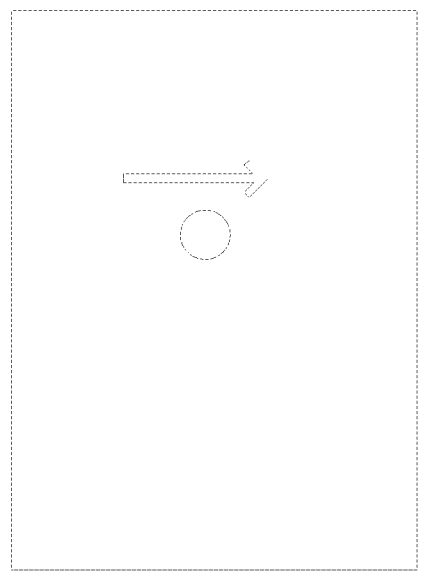
FIG. 5 is a schematic diagram showing a user interface according to an example.

For example, in order to avoid the user from remembering the first preset position, which causes poor user experience, the moving direction corresponding to the first preset position may be displayed to the user via the user interface (referred to as UI for short) of the wireless charging receiver, such as on a screen, as shown in FIG. 3. In FIG. 3, the solid-line circle indicates the current position of the center of the charging coil of the wireless charging receiver, and the dotted-line circle indicates the first preset position to which the wireless charging receiver is to be moved. As shown in FIG. 4, during the movement of the wireless charging receiver by the user in the moving direction, the display of the current position and the first preset position of the wireless charging receiver may be adjusted in real time. As shown in FIG. 5, when the solid-line circle and the dotted-line circle coincide, it indicates that the wireless charging receiver is moved to the first preset position.

Step S103: upon movement of the wireless charging receiver from the first preset position to a second preset position relative to the wireless charging transmitter, acquiring charging quality of the wireless charging receiver at the second preset position relative to the wireless charging transmitter.

Upon acquisition of the first charging quality, the user may, based on a second preset position relative to the wireless charging transmitter, continue to move the wireless charging receiver to the second preset position relative to the wireless charging transmitter, and the corresponding second charging quality is acquired after the movement. In this case, the method for acquiring the charging quality is the same as the method for acquiring the current charging quality at the current position in step S101, and details are not described herein.

For example, a prompting method for the second preset position may be the same as that for the first preset position. For details, reference may be made to the description relating to the prompting method for the first preset position, and a repeated discussion is omitted herein.

Step S104: determining relative position information of the wireless charging receiver relative to the wireless charging transmitter, based on the current charging quality at the current position, the first charging quality and the second charging quality.

The relative position information of the wireless charging receiver relative to the wireless charging transmitter is determined based on the current charging quality at the current position, the first charging quality and the second charging quality, that are acquired in the above steps S101 to S103. That is, position offsets of the wireless charging receiver relative to the wireless charging transmitter in the X and Y directions in FIG. 1 are determined.

For example, the position offset of the wireless charging receiver relative to the wireless charging transmitter is 6 mm in the X direction, and 8 mm in the Y direction.

Step S105: acquiring position correction information of the wireless charging receiver corresponding to the relative position information.

Continuing with the above example, as can be seen from FIG. 1, the charging efficiency is 63.9%, and there is still room for improvement. If the charging efficiency is to be improved to 72.9%, the wireless charging receiver should be moved in parallel to a zero-offset position in the X direction, as can be derived from FIG. 1. In this case, the above position correction information is moving the wireless charging receiver in parallel to the zero-offset position in the X direction.

Step S106: upon correction of a position of the wireless charging receiver based on the position correction information, charging the wireless charging receiver at the corrected position.

Similar to displaying the first preset position, upon acquisition of the position correction information, it can be displayed to the user via the UI so that the user performs position correction on the wireless charging receiver, and after the position correction is completed, the wireless charging receiver is charged at the corrected position.

In order to avoid the user from remembering the preset positions with poor user experience and guide user to move the wireless charging receiver to the corrected or intended position, these positions may be displayed on a user interface or a screen of a terminal device including the wireless charging receiver. A first pattern indicating the current position of the wireless charging receiver and a second pattern, at a second position on the screen, indicating a target position based on the position correction information may be displayed to the user, and during movement of the wireless charging receiver, display of the current position and the second position is adjusted in real time. An arrow indicating the direction of movement may also be displayed. Upon detecting that the wireless charging receiver is moved to the target position, an overlapping pattern of the first pattern and the second pattern may be displayed.

According to the example of the present disclosure, there is provided a method for controlling wireless charging, the method including: acquiring charging quality of a wireless charging receiver at a current position relative to a wireless charging transmitter, the charging quality including coupling signal intensity or charging efficiency; upon movement of the wireless charging receiver from the current position to a first preset position relative to the wireless charging transmitter, acquiring charging quality of the wireless charging receiver at the first preset position relative to the wireless charging transmitter; upon movement of the wireless charging receiver from the first preset position to a second preset position relative to the wireless charging transmitter, acquiring charging quality of the wireless charging receiver at the second preset position relative to the wireless charging transmitter; determining relative position information of the wireless charging receiver relative to the wireless charging transmitter, based on the current charging quality at the current position, the first charging quality and the second charging quality; acquiring position correction information of the wireless charging receiver corresponding to the relative position information; and upon correction of a position of the wireless charging receiver based on the position correction information, charging the wireless charging receiver at the corrected position. Based on the current charging quality at the current position, the first charging quality and the second charging quality, the relative position information of the wireless charging receiver relative to the wireless charging transmitter can be determined. Further, based on the relative position information, the position correction information for improving the charging quality of the wireless charging transmitter for the wireless charging receiver is acquired. The position of the wireless charging receiver is corrected based on the position correction information, so that the charging quality of the wireless charging transmitter for the wireless charging receiver at the corrected position is higher than that at the current position, thereby effectively improving the charging quality.

In an example, the above step S104 includes following sub-steps A1 to A2.

Step A1: determining a target quadrant of the wireless charging receiver in a preset rectangular coordinate system provided at the wireless charging transmitter, based on the current charging quality at the current position, the first charging quality and the second charging quality, an intersection of two axes of the preset rectangular coordinate system being a center of a charging coil in the wireless charging transmitter.

Step A2: determining the relative position information, based on the target quadrant.

After the rectangular coordinate system is preset at the wireless charging transmitter, the target quadrant of the wireless charging receiver may be acquired based on the current charging quality at the current position, the first charging quality and the second charging quality. Based on the target quadrant, the relative position information of the wireless charging receiver relative to the wireless charging transmitter may be acquired.

Figure 6:
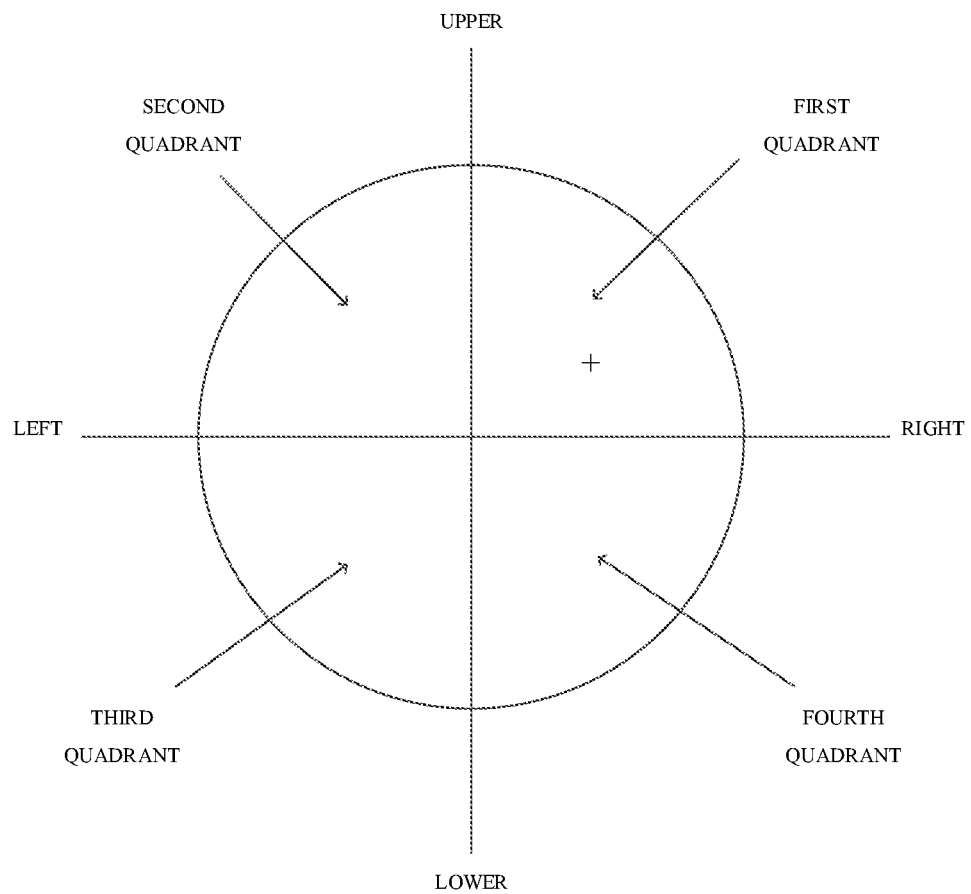
FIG. 6 is a schematic diagram showing a preset rectangular coordinate system in a wireless charging transmitter according to an example.

Taking charging quality being charging efficiency as an example, as shown in FIG. 6, a preset rectangular coordinate system may be provided at the wireless charging transmitter, based on the charging efficiency in FIG. 1. In the preset rectangular coordinate system, the left-right coordinate axis represents the axis corresponding to the zero-offset in the Y direction in FIG. 1, the up-down coordinate axis represents the axis corresponding to the zero-offset in the X direction in FIG. 1, and the "+" represents the position of the center of the charging coil of the wireless charging receiver. The closer to the center of the coordinate axes, the higher the charging efficiency is. In practical applications, it is possible that the center of the charging coil of the wireless charging receiver is located anywhere in the four quadrants. In some examples, when terms indicating directions such as left, right, up and down are used, they refer to the directions with respect to the preset rectangular coordinate system. They may or may not be the directions with respect to the user.

According to the example of the present disclosure, by providing the preset rectangular coordinate system, the accuracy in determining the relative position information is improved.

In an example, the position correction information includes a preset moving direction and a preset movement distance, and the above step S106 includes a following sub-step of:

upon movement of the wireless charging receiver in accordance with the preset moving direction and the preset movement distance, charging the wireless charging receiver at a position after the movement.

Continuing with the example in which the charging quality is charging efficiency, in order to improve the charging efficiency, the center of the charging coil of the wireless charging receiver has to be moved to coincide with that of the wireless charging transmitter, as shown in FIG. 1. Accordingly, the movement may be performed in accordance with the preset moving direction and the preset movement distance so that the center of the charging coil of the wireless charging receiver coincides with that of the wireless charging transmitter.

In an example, the preset moving direction includes a first preset direction, the preset movement distance includes a first preset distance, and said upon movement of the wireless charging receiver in accordance with the preset moving direction and the preset movement distance, charging the wireless charging receiver at a position after the movement includes following sub-steps B1 to B4.

Step B1: outputting a first prompt message, the first prompt message prompting the wireless charging receiver to move by the first preset distance in the first preset direction.

For example, the first prompt message may be the interface display message similar to that in FIG. 3, so that the user moves the wireless charging receiver in the direction indicated by the arrow.

Step B2: upon movement of the wireless charging receiver by the first preset distance in the first preset direction to a third position relative to the wireless charging transmitter, acquiring charging quality of the wireless charging receiver at the third position.

Step B3: in a case where the charging quality at the third position is lower than the second charging quality, outputting a second prompt message, the second prompt message prompting the wireless charging receiver to move by the first preset distance in a second preset direction, the second preset direction being opposite to the first preset direction.

In a case where the charging quality at the third position is lower than the second charging quality, it indicates that the charging quality is reduced, that is, the movement is incorrect. In this case, movement in the second preset direction opposite to the first preset direction is required. In this case, to make the user know that the current moving direction is incorrect and the movement in the correct direction is required, a second prompt message will be output to the user for prompting the user to move the wireless charging receiver by the first preset distance in the second preset direction.

For example, the second prompt message may be the interface display message similar to that in FIG. 3, so that the user moves the wireless charging receiver in the direction indicated by the arrow. Reference may be made to the example corresponding to FIG. 3, and details are not described herein.

Step B4: in a case where the charging quality at the third position is higher than the second charging quality, repeating the step of outputting the first prompt message and acquiring the charging quality, until the charging quality of the wireless charging receiver at the position after the movement by the first preset distance in the first preset direction is lower than the charging quality of the wireless charging receiver before the movement, and outputting the second prompt message.

In a case where the charging quality at the third position is higher than the second charging quality, it indicates that the charging quality is improved, that is, the movement is correct. However, although the charging quality at the third position is higher than the second charging quality, it does not indicate that the charging quality at the third position is the highest. In this case, the first prompt message is still output to the user for prompting the user to continue to move the wireless charging receiver by the first preset distance in the first preset direction. After the movement, the charging quality at the new position is acquired. In a case where the charging quality at the new position is higher than the charging quality at the adjacent previous or last position, it indicates that the charging quality is improved, that is, the movement is correct. However, it still does not indicate that the charging quality at the new position is the highest. In this case, the first prompt message is still output to the user for prompting the user to continue to move the wireless charging receiver by the first preset distance in the first preset direction, until the charging quality of the wireless charging receiver at the position after the movement by the first preset distance in the first preset direction is lower than the charging quality of the wireless charging receiver before the movement, which indicates that the charging quality is reduced (i.e., the movement is incorrect), and the charging quality at the adjacent previous position is the highest. Then, the wireless charging receiver should be moved back to the adjacent previous position, that is, the wireless charging receiver should be moved in the second preset direction opposite to the first preset direction. In this case, in order to make the user know that the current moving direction is incorrect and a movement in a direction towards the highest charging quality is required, a second prompt message will be output to the user for prompting the user to move the wireless charging receiver by the first preset distance in the second preset direction.

According to the example of the present disclosure, by determining the magnitude relationship between the charging quality at the position after the movement and the charging quality at the adjacent previous position, whether the movement is correct can be known, thereby effectively improving the charging quality.

In an example, upon movement of the wireless charging receiver by the first preset distance in the second preset direction, the wireless charging receiver is charged at the position after the movement.

Since the charging quality after the movement in the preset second direction is higher than that before the movement, the charging quality is effectively improved by charging the wireless charging receiver at the position after the movement by the first preset distance in the second preset direction.

In an example, the preset moving direction further includes a third preset direction, the preset movement distance further includes a second preset distance, and the method further includes following sub-steps C1 to C6.

Step C1: upon movement of the wireless charging receiver by the first preset distance in the second preset direction to a fourth position relative to the wireless charging transmitter, acquiring charging quality of the wireless charging receiver at the fourth position.

Step C2: outputting a third prompt message, the third prompt message prompting the wireless charging receiver to move by the second preset distance in the third preset direction.

For example, the third prompt message may be the interface display message similar to that in FIG. 3, so that the user moves the wireless charging receiver in the direction indicated by the arrow. Reference may be made to the example corresponding to FIG. 3, and details are not described herein.

During the movement of the wireless charging receiver, although the position at which the charging quality is the highest will appear during the movements in the first preset direction and the second preset direction, it is possible that the charging quality at this position may not be the highest in another different direction. In order to acquire the position at which the charging quality is truly the highest, the charging quality of the wireless charging receiver at the fourth position is acquired after the movement to the fourth position. Thus, a third prompt information is output to the user for prompting the user to move the wireless charging receiver by the second preset distance in the third preset direction, so that the user moves the wireless charging receiver by the second preset distance in the third preset direction.

Taking the charging quality being the charging efficiency as an example, as shown in FIG. 1, it is assumed that when the wireless charging receiver is moved by the first preset distance in the second preset direction to the fourth position relative to the wireless charging transmitter, the acquired charging efficiency of the wireless charging receiver at the fourth position is 78.8%. Although the charging efficiency of 78.8% is the highest in the lateral direction or the X direction, it is not the highest in the longitudinal direction or the Y direction, because it is also possible to achieve a charging efficiency of 81.6%. Therefore, it is desirable to continue to move the wireless charging receiver in the longitudinal direction or the vertical direction, until the charging quality reaches 81.6%.

Step C3: upon movement of the wireless charging receiver by the second preset distance in the third preset direction to a fifth position relative to the wireless charging transmitter, acquiring charging quality of the wireless charging receiver at the fifth position.

Step C4: in a case where the charging quality at the fifth position is lower than the charging quality at the fourth position, outputting a fourth prompt message, the fourth prompt message prompting the wireless charging receiver to move by the second preset distance in a fourth preset direction, the fourth preset direction being opposite to the third preset direction.

For example, the fourth prompt message may be the interface display message similar to that in FIG. 3, so that the user moves the wireless charging receiver in the direction indicated by the arrow. Reference may be made to the example corresponding to FIG. 3, and details are not described herein.

In a case where the charging quality at the fifth position is lower than the charging quality at the fourth position, it indicates that the charging quality is reduced, that is, the movement is incorrect. In this case, the wireless charging receiver has to be moved back to the fourth position with higher charging quality. Then, in order to make the user know that the current moving direction is incorrect and a movement in the correct direction is required, a fourth prompt message will be output to the user for prompting the user to move the wireless charging receiver by the second preset distance in the fourth preset direction.

Step C5: in a case where the charging quality at the fifth position is higher than the charging quality at the fourth position, repeating the step of outputting the third prompt message and acquiring the charging quality, until the charging quality of the wireless charging receiver at the position after the movement by the second preset distance in the third preset direction is lower than the charging quality of the wireless charging receiver before the movement, and outputting the fourth prompt message.

In a case where the charging quality at the fifth position is higher than the charging quality at the fourth position, it indicates that the charging quality is improved, that is, the movement is correct. However, it does not indicate that the charging quality at the fifth position is the highest. In this case, the third prompt message is still output to the user for prompting the user to continue to move the wireless charging receiver by the second preset distance in the third preset direction. After the movement, the charging quality at the new position is acquired. In a case where the charging quality at the new position is still higher than the charging quality at the adjacent previous or last position, it indicates that the charging quality is improved, that is, the movement is correct. However, it still does not indicate that the charging quality at the new position is the highest. In this case, the third prompt message is still output to the user for prompting the user to continue to move the wireless charging receiver by the second preset distance in the third preset direction, until the charging quality of the wireless charging receiver at the position after the movement by the second preset distance in the third preset direction is lower than the charging quality of the wireless charging receiver before the movement, which indicates that the charging quality is reduced (i.e., the movement is incorrect), and the charging quality at the adjacent previous position is the highest. Then, the wireless charging receiver has to be moved back to the previous position, that is, the wireless charging receiver has to be moved in the fourth preset direction opposite to the third preset direction. In this case, in order to make the user know that the current moving direction is incorrect and a movement in a direction towards the highest charging quality is required, a fourth prompt message will be output to the user for prompting the user to move the wireless charging receiver by the second preset distance in the fourth preset direction.

Step C6: upon movement of the wireless charging receiver by the second preset distance in the fourth preset direction, charging the wireless charging receiver at the position after the movement.

According to the example of the present disclosure, by adjusting the position or relative position of the wireless charging receiver and the wireless charging transmitter in different directions, the charging quality can be effectively improved.

Figure 7:
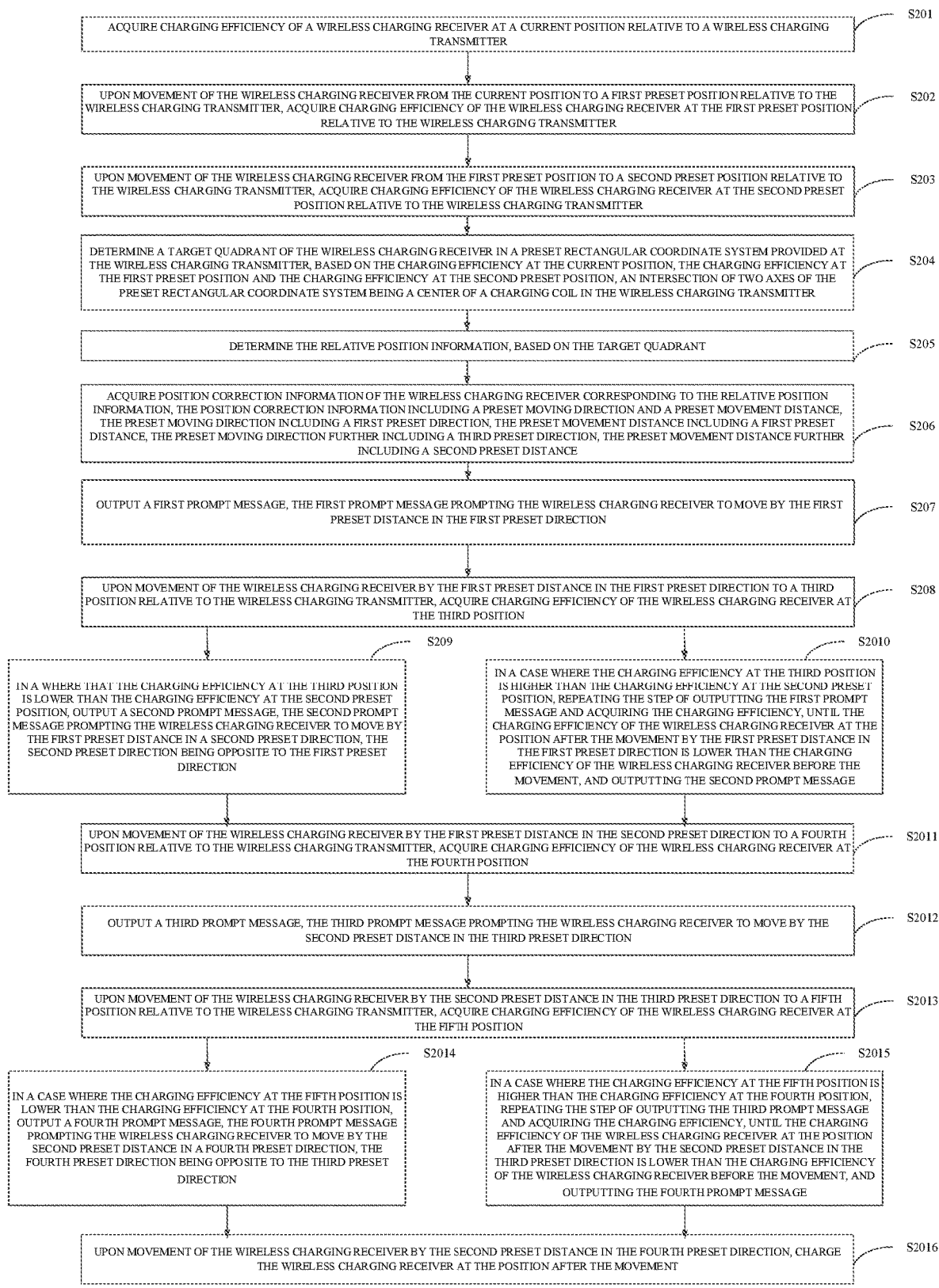
FIG. 7 is a flowchart showing a method for controlling wireless charging according to an example.

FIG. 7 is a flowchart showing a method for controlling wireless charging according to an example. As shown in FIG. 7, the charging quality in this method is the charging efficiency, and the method includes following steps S201 to S2016.

Step S201: acquiring charging efficiency of a wireless charging receiver at a current position relative to a wireless charging transmitter.

The wireless charging receiver and the wireless charging transmitter perform the protocol interaction based on the Qi standard, and the wireless charging receiver is charged after the protocol communication is completed. The wireless charging receiver acquires the input voltage and current of the wireless charging transmitter, and acquires the charging efficiency $\eta_1$ at the current position according to its own output voltage and current.

Step S202: upon movement of the wireless charging receiver from the current position to a first preset position relative to the wireless charging transmitter, acquiring charging efficiency of the wireless charging receiver at the first preset position relative to the wireless charging transmitter.

As shown in FIG. 3, the UI interface of the wireless charging receiver displays the first preset position and the moving direction.

For example, the first preset position may be a position after the movement to the right by the preset length, for example 1 mm. In this case, the interface of the wireless charging receiver displays the center position of the charging coil of the wireless charging receiver and the position after the movement to the right by 1 mm. The user's hand moves to the right by 1 mm according to the display of the UI interface, until the solid-line circle is moved to coincide with the dotted-line circle, so that the wireless charging receiver is moved to the first preset position. Then, the wireless charging receiver calculates the charging efficiency $\eta_2$ at the first preset position.

Step S203: upon movement of the wireless charging receiver from the first preset position to a second preset position relative to the wireless charging transmitter, acquiring charging efficiency of the wireless charging receiver at the second preset position relative to the wireless charging transmitter.

Figure 8:
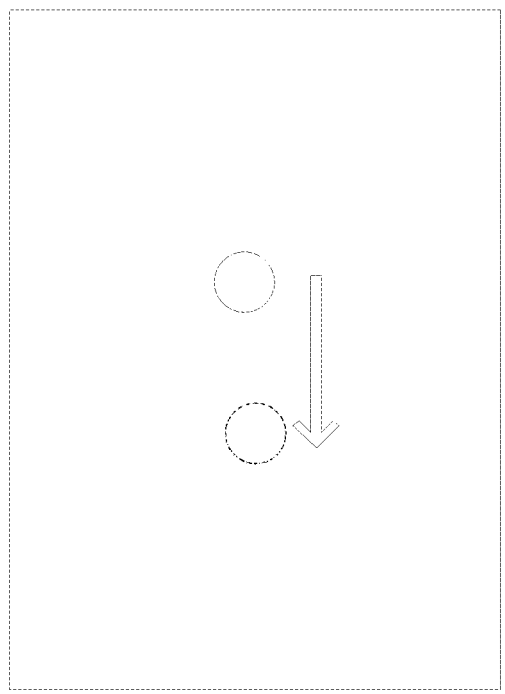
FIG. 8 is a schematic diagram showing a user interface according to an example.

The wireless charging receiver is further moved to the second preset position. For example, the second preset position may be a position after the movement downward by the preset length, for example 1 mm. In this case, as shown in FIG. 8, the interface of the wireless charging receiver displays the center position of the charging coil of the wireless charging receiver and the position after the movement downward by 1 mm. The user's hand moves downward by 1 mm according to the display of the UI interface, until the solid-line circle is moved to coincide with the dotted-line circle, so that the wireless charging receiver is moved to the second preset position. Then, the wireless charging receiver calculates the charging efficiency $\eta_3$ at the second preset position.

For example, the moving direction of the first preset position is perpendicular to the moving direction of the second preset position.

Step S204: determining a target quadrant of the wireless charging receiver in a preset rectangular coordinate system provided at the wireless charging transmitter, based on the charging efficiency at the current position, the charging efficiency at the first preset position and the charging efficiency at the second preset position, an intersection of two axes of the preset rectangular coordinate system being a center of a charging coil in the wireless charging transmitter.

Step S205: determining the relative position information, based on the target quadrant.

With reference to FIG. 1 and FIG. 6, according to the relationship among $\eta_1$, $\eta_2$, and $\eta_3$, the wireless charging receiver will know the target quadrant, in the preset rectangular coordinate system at the wireless charging transmitter, where the wireless charging receiver is located.

If $\eta_2<\eta_1$, $\eta_3>\eta_1$, the target quadrant where the center of the charging coil of the wireless charging receiver is located is the first quadrant.

If $\eta_2>\eta_1$, $\eta_3>\eta_1$, the target quadrant where the center of the charging coil of the wireless charging receiver is located is the second quadrant.

If $\eta_2>\eta_1$, $\eta_3<\eta_1$, the target quadrant where the center of the charging coil of the wireless charging receiver is located is the third quadrant.

If $\eta_2<\eta_1$, $\eta_3<\eta_1$, the target quadrant where the center of the charging coil of the wireless charging receiver is located is the fourth quadrant.

Step S206: acquiring position correction information of the wireless charging receiver corresponding to the relative position information, wherein the position correction information includes a preset moving direction and a preset movement distance, the preset moving direction includes a first preset direction, the preset movement distance includes a first preset distance, the preset moving direction further includes a third preset direction, and the preset movement distance further includes a second preset distance.

After the target quadrant where the center of the charging coil of the wireless charging receiver is located is acquired, how to move the center of the charging coil of the wireless charging receiver to the center of the coordinate axes can be known.

Step S207: outputting a first prompt message, the first prompt message prompting the wireless charging receiver to move by the first preset distance in the first preset direction.

In a case where the target quadrant where the center of the charging coil of the wireless charging receiver is located is the first quadrant, the first preset direction may be the rightward or leftward direction, or the first preset direction may be the upward or downward direction. Accordingly, the first preset distance may be 2 mm.

For example, if the first preset direction is the rightward direction, and the first preset distance is 2 mm, then the output first prompt message may be the UI prompting the user to move to the right further by 2 mm from the second preset position.

Step S208: upon movement of the wireless charging receiver by the first preset distance in the first preset direction to a third position relative to the wireless charging transmitter, acquiring charging efficiency of the wireless charging receiver at the third position.

After the wireless charging receiver is moved by the user from the second preset position to the right by 2 mm to the third position according to the UI prompt, the wireless charging receiver calculates the charging efficiency $\eta_2'$ at the third position.

Step S209: in a case where the charging efficiency at the third position is lower than the charging efficiency at the second preset position, outputting a second prompt message prompting the wireless charging receiver to move by the first preset distance in a second preset direction, the second preset direction being opposite to the first preset direction.

If $\eta_2'<\eta_2$, the UI prompts the user to retreat to the second preset position, that is, move to the left by 2 mm. Then, the second prompt message is output. Continuing with the above example, if the second preset direction is the leftward direction and the first preset distance is 2 mm, then the output second prompt message may be the UI prompting the user to move to the left by 2 mm from the third position.

Through the above steps, the UI prompts the user to complete the alignment in a range of ±2 mm between the center of the charging coil of the wireless charging receiver and the center of the charging coil of the wireless charging transmitter in the left-right direction.

Step S2010: in a case where the charging efficiency at the third position is higher than the charging efficiency at the second preset position, repeating the step of outputting the first prompt message and acquiring the charging efficiency, until the charging efficiency of the wireless charging receiver at the position after the movement by the first preset distance in the first preset direction is lower than the charging efficiency of the wireless charging receiver before the movement, and outputting the second prompt message.

If $\eta_2'<\eta_2$, the UI continues to prompt the user to further move by 2 mm to the right, until the charging efficiency of the wireless charging receiver at the position after the movement is lower than the charging efficiency of the wireless charging receiver before the movement. Then, the movement to the right is stopped and the second prompt message is output. That is, the user is prompted to move the wireless charging receiver back to the previous position according to the second prompt message.

Step S2011: upon movement of the wireless charging receiver by the first preset distance in the second preset direction to a fourth position relative to the wireless charging transmitter, acquiring charging efficiency of the wireless charging receiver at the fourth position.

After the wireless charging receiver is moved by the user to the fourth position according to the second prompt message, the charging efficiency μ of the wireless charging receiver at the fourth position is acquired.

Step S2012: outputting a third prompt message, the third prompt message prompting the wireless charging receiver to move by the second preset distance in the third preset direction.

For example, if the third preset direction is the up-down direction, then the alignment calibration of the charging coil of the wireless charging receiver in the up-down direction is continued. The UI prompts the user to continue to move the wireless charging receiver from the fourth position downward by 2 mm to the fifth position.

Step S2013: upon movement of the wireless charging receiver by the second preset distance in the third preset direction to a fifth position relative to the wireless charging transmitter, acquiring charging efficiency of the wireless charging receiver at the fifth position.

After the wireless charging receiver is further moved by the user from the fourth position downward by 2 mm to the fifth position according to the UI prompt, the wireless charging receiver calculates the charging efficiency $\eta_3'$ at the fifth position.

Step S2014: in a case where the charging efficiency at the fifth position is lower than the charging efficiency at the fourth position, outputting a fourth prompt message prompting the wireless charging receiver to move by the second preset distance in a fourth preset direction, the fourth preset direction being opposite to the third preset direction.

If $\eta_3'<\mu$, the UI prompts the user to retreat to the fourth position, that is, move upward by 2 mm. In this case, the fourth prompt message is output. Continuing with the above example, if the fourth preset direction is the upward direction, and the second preset distance is 2 mm, then the output fourth prompt message may be the UI prompting the user to move upward by 2 mm from the fifth position.

Step S2015: in a case where the charging efficiency at the fifth position is higher than the charging efficiency at the fourth position, repeating the step of outputting the third prompt message and acquiring the charging efficiency, until the charging efficiency of the wireless charging receiver at the position after the movement by the second preset distance in the third preset direction is lower than the charging efficiency of the wireless charging receiver before the movement, and outputting the fourth prompt message.

If $\eta_3'>\mu$, the UI continues to prompt the user to further move by 2 mm downward, until the charging efficiency of the wireless charging receiver at the position after the movement is lower than the charging efficiency of the wireless charging receiver before the movement. Then, the downward movement is stopped and the fourth prompt message is output. That is, the user is prompted to move the wireless charging receiver back to the previous position according to the fourth prompt message.

Through the above steps, the UI prompts the user to complete the alignment in a range of ±2 mm between the center of the charging coil of the wireless charging receiver and the center of the charging coil of the wireless charging transmitter in the up-down direction.

Step S2016: upon movement of the wireless charging receiver by the second preset distance in the fourth preset direction, charging the wireless charging receiver at the position after the movement.

Through the method of the present disclosure, no matter which quadrant of the preset coordinate system the center of the charging coil of the wireless charging receiver is initially placed in, the offset between the center of the charging coil of the wireless charging receiver and the center of the charging coil of the wireless charging transmitter can be adjusted to be in a range of ±2 mm. Of course, if the movement distance is selected to be 1 mm, the offset between the center of the charging coil of the wireless charging receiver and the center of the charging coil of the wireless charging transmitter can be adjusted to be in a range of ±1 mm by this method, and so on.

The method provided by the present disclosure can optimize the user's wireless charging experience, that is, wireless charging is implemented with higher charging efficiency. High-efficiency charging greatly improves the reduction of heat generation and improves the safety of charging.

The method for controlling wireless charging according to the present disclosure is optimized based on the wireless charging algorithm. That is, when the wireless charging receiver is placed at the wireless charging transmitter for charging, firstly, based on the calculated charging efficiency, the position of the center of the charging coil of the wireless charging receiver is confirmed by moving the position of the center of the charging coil of the wireless charging receiver to the left and to the right by 1 mm. The position is then continued to be optimized based on the current position, until the offset between the center of the charging coil of the wireless charging receiver and the center of the charging coil of the wireless charging transmitter is adjusted to be in a range of ±2 mm or ±1 mm, thereby achieving efficient wireless charging.

The following are exemplary devices according to the present disclosure, which may be configured to implement the exemplary methods according to the present disclosure.

Figure 9:
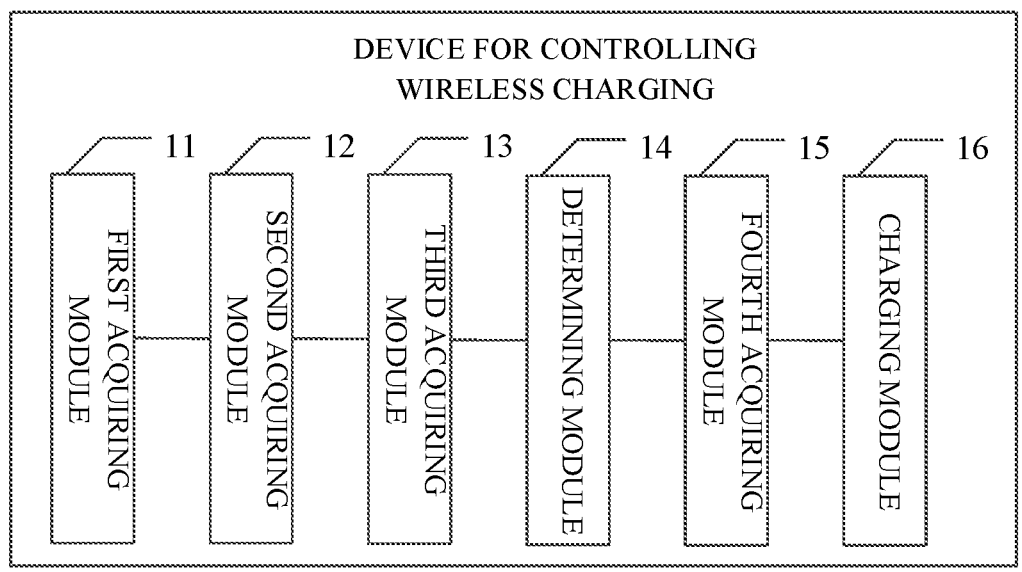
FIG. 9 is a block diagram showing a device for controlling wireless charging according to an example.

FIG. 9 is a block diagram showing a device for controlling wireless charging according to an example. The device may be implemented as a part of or the whole of an electronic device by software, hardware or a combination of software and hardware. As shown in FIG. 9, the device for controlling wireless charging includes:

a first acquiring module 11 configured to acquire charging quality of a wireless charging receiver at a current position relative to a wireless charging transmitter, the charging quality including coupling signal intensity or charging efficiency;

a second acquiring module 12 configured to, upon movement of the wireless charging receiver from the current position to a first preset position relative to the wireless charging transmitter, acquire charging quality of the wireless charging receiver at the first preset position relative to the wireless charging transmitter;

a third acquiring module 13 configured to, upon movement of the wireless charging receiver from the first preset position to a second preset position relative to the wireless charging transmitter, acquire charging quality of the wireless charging receiver at the second preset position relative to the wireless charging transmitter;

a determining module 14 configured to determine relative position information of the wireless charging receiver relative to the wireless charging transmitter, based on the current charging quality at the current position acquired by the first acquiring module 11, the first charging quality acquired by the second acquiring module 12 and the second charging quality acquired by the third acquiring module 13;

a fourth acquiring module 15 configured to acquire position correction information of the wireless charging receiver corresponding to the relative position information determined by the determining module 14; and a charging module 16 configured to, upon correction of a position of the wireless charging receiver based on the position correction information acquired by the fourth acquiring module 15, charge the wireless charging receiver at the corrected position.

Figure 10:
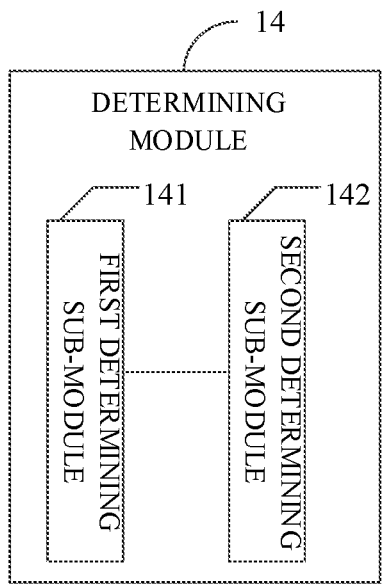
FIG. 10 is a block diagram showing a device for controlling wireless charging according to an example.

In an example, as shown in FIG. 10, the determining module 14 includes a first determining sub-module 141 and a second determining sub-module 142.

The first determining sub-module 141 is configured to determine a target quadrant of the wireless charging receiver in a preset rectangular coordinate system provided at the wireless charging transmitter, based on the current charging quality at the current position acquired by the first acquiring module 11, the first charging quality acquired by the second acquiring module 12 and the second charging quality acquired by the third acquiring module 13. An intersection of two axes of the preset rectangular coordinate system is a center of a charging coil in the wireless charging transmitter.

The second determining sub-module 142 is configured to determine the relative position information, based on the target quadrant determined by the first determining sub-module 141.

Figure 11:
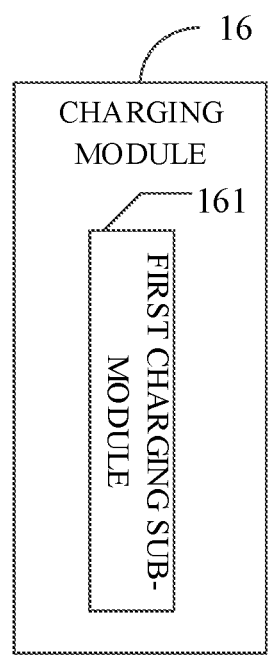
FIG. 11 is a block diagram showing a device for controlling wireless charging according to an example.

In an example, as shown in FIG. 11, the position correction information includes a preset moving direction and a preset movement distance, and the charging module 16 includes a first charging sub-module 161.

The first charging sub-module 161 is configured to, upon movement of the wireless charging receiver in accordance with the preset moving direction and the preset movement distance acquired by the fourth acquiring module 15, charge the wireless charging receiver at a position after the movement.

Figure 12:
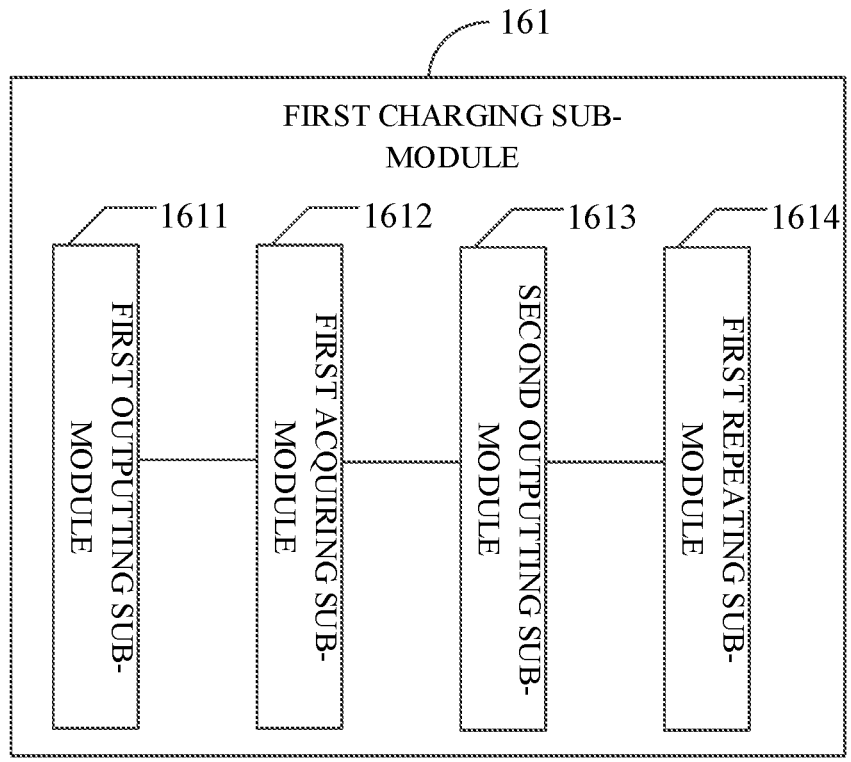
FIG. 12 is a block diagram showing a device for controlling wireless charging according to an example.

In an example, as shown in FIG. 12, the preset moving direction includes a first preset direction, the preset movement distance includes a first preset distance, and the first charging sub-module 161 includes a first outputting sub-module 1611, a first acquiring sub-module 1612, a second outputting sub-module 1613 and a first repeating sub-module 1614.

The outputting sub-module 1611 is configured to, upon movement of the wireless charging receiver in accordance with the preset moving direction and the preset movement distance acquired by the fourth acquiring module 15, output a first prompt message, the first prompt message prompting the wireless charging receiver to move by the first preset distance in the first preset direction.

The first acquiring sub-module 1612 is configured to, upon movement of the wireless charging receiver by the first preset distance in the first preset direction output by the first outputting sub-module 1611 to a third position relative to the wireless charging transmitter, acquire charging quality of the wireless charging receiver at the third position.

The second outputting sub-module 1613 is configured to, in a case where the charging quality at the third position is lower than the second charging quality, output a second prompt message, the second prompt message prompting the wireless charging receiver to move by the first preset distance in a second preset direction, the second preset direction being opposite to the first preset direction.

The first repeating sub-module 1614 is configured to, in a case where the charging quality at the third position is higher than the second charging quality, repeat the step of outputting the first prompt message and acquiring the charging quality, until the charging quality of the wireless charging receiver at the position after the movement by the first preset distance in the first preset direction is lower than the charging quality of the wireless charging receiver before the movement, and output the second prompt message.

Figure 13:
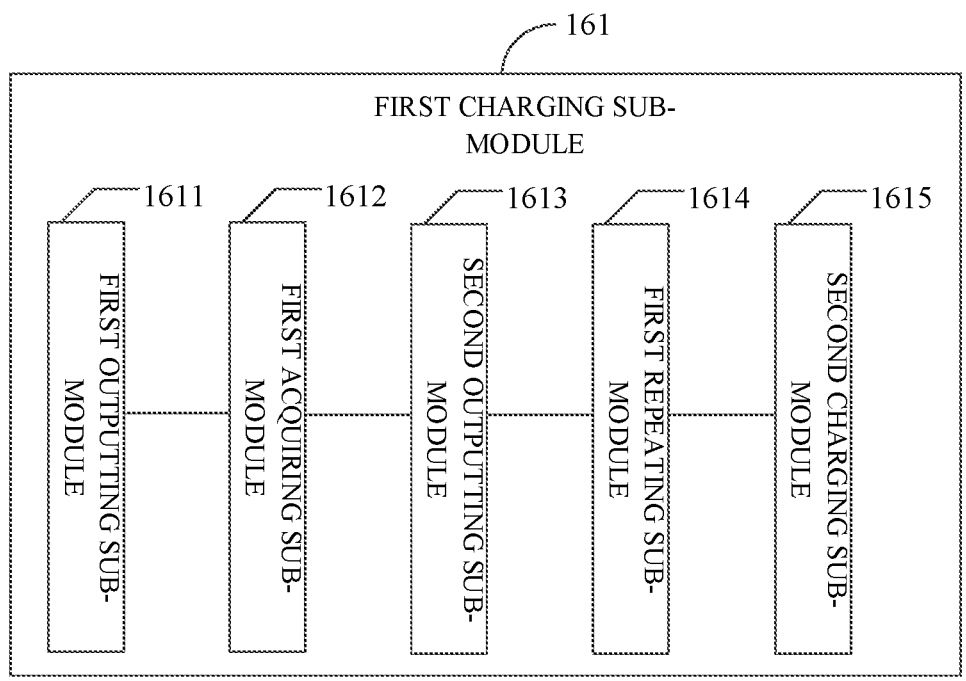
FIG. 13 is a block diagram showing a device for controlling wireless charging according to an example.

In an example, as shown in FIG. 13, the first charging sub-module 161 further includes a second charging sub-module 1615.

The second charging sub-module 1615 is configured to, upon movement of the wireless charging receiver by the first preset distance in the second preset direction, charge the wireless charging receiver at the position after the movement.

Figure 14:
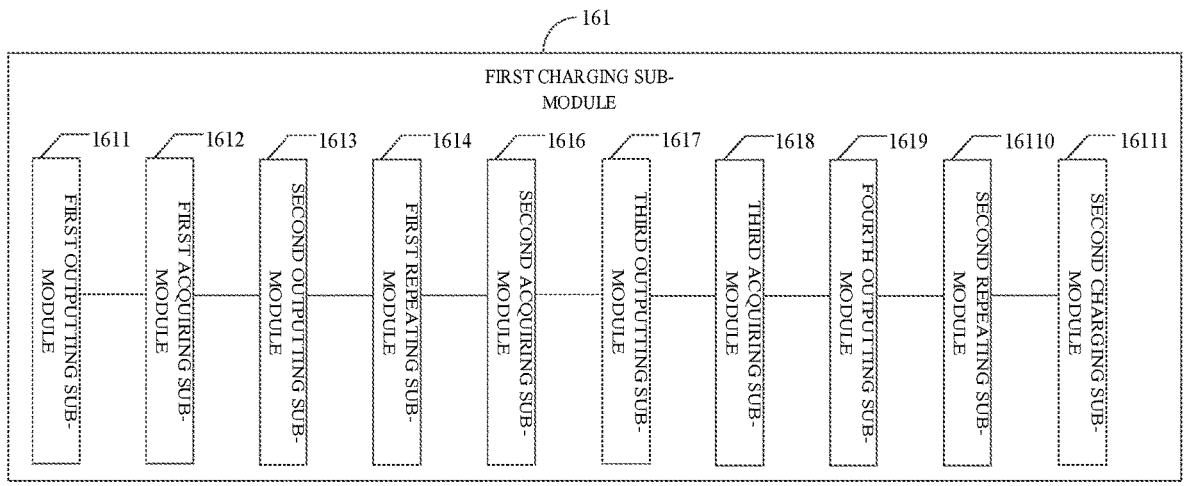
FIG. 14 is a block diagram showing a device for controlling wireless charging according to an example.

In an example, as shown in FIG. 14, the preset moving direction further includes a third preset direction, the preset movement distance further includes a second preset distance, and the first charging sub-module 161 further includes a second acquiring sub-module 1616, a third outputting sub-module 1617, a third acquiring sub-module 1618, a fourth outputting sub-module 1619, a second repeating sub-module 16110 and a second charging sub-module 16111.

The second acquiring sub-module 1616 is configured to, upon movement of the wireless charging receiver by the first preset distance in the second preset direction to a fourth position relative to the wireless charging transmitter, acquire charging quality of the wireless charging receiver at the fourth position.

The third outputting sub-module 1617 is configured to output a third prompt message, the third prompt message prompting the wireless charging receiver to move by the second preset distance in the third preset direction.

The third acquiring sub-module 1618 is configured to, upon movement of the wireless charging receiver by the second preset distance in the third preset direction to a fifth position relative to the wireless charging transmitter, acquire charging quality of the wireless charging receiver at the fifth position.

The fourth outputting sub-module 1619 is configured to, in a case where the charging quality at the fifth position is lower than the charging quality at the fourth position, output a fourth prompt message, the fourth prompt message prompting the wireless charging receiver to move by the second preset distance in a fourth preset direction, the fourth preset direction being opposite to the third preset direction.

The second repeating sub-module 16110 is configured to, in a case where the charging quality at the fifth position is higher than the charging quality at the fourth position, repeat the step of outputting the third prompt message and acquiring the charging quality, until the charging quality of the wireless charging receiver at the position after the movement by the second preset distance in the third preset direction is lower than the charging quality of the wireless charging receiver before the movement, and output the fourth prompt message.

The second charging sub-module 16111 is configured to, upon movement of the wireless charging receiver by the second preset distance in the fourth preset direction, charge the wireless charging receiver at the position after the movement.

According to an aspect of the examples of the present disclosure, there is provided a device for controlling wireless charging. The device includes:

a processor; and a memory for storing instructions executable by the processor, wherein the processor is configured to:

acquire charging quality of a wireless charging receiver at a current position relative to a wireless charging transmitter, the charging quality including coupling signal intensity or charging efficiency;

upon movement of the wireless charging receiver from the current position to a first preset position relative to the wireless charging transmitter, acquire charging quality of the wireless charging receiver at the first preset position relative to the wireless charging transmitter;

upon movement of the wireless charging receiver from the first preset position to a second preset position relative to the wireless charging transmitter, acquire charging quality of the wireless charging receiver at the second preset position relative to the wireless charging transmitter;

determine relative position information of the wireless charging receiver relative to the wireless charging transmitter, based on the current charging quality at the current position, the first charging quality and the second charging quality;

acquire position correction information of the wireless charging receiver corresponding to the relative position information; and upon correction of a position of the wireless charging receiver based on the position correction information, charge the wireless charging receiver at the corrected position.

The above processor may be further configured as follows.

Said determining relative position information of the wireless charging receiver relative to the wireless charging transmitter, based on the current charging quality at the current position, the first charging quality and the second charging quality includes:

determining a target quadrant of the wireless charging receiver in a preset rectangular coordinate system provided at the wireless charging transmitter, based on the current charging quality at the current position, the first charging quality and the second charging quality, an intersection of two axes of the preset rectangular coordinate system being a center of a charging coil in the wireless charging transmitter; and determining the relative position information, based on the target quadrant.

The position correction information includes a preset moving direction and a preset movement distance, and said upon correction of a position of the wireless charging receiver based on the position correction information, charging the wireless charging receiver at the corrected position includes:

upon movement of the wireless charging receiver in accordance with the preset moving direction and the preset movement distance, charging the wireless charging receiver at a position after the movement.

The preset moving direction includes a first preset direction, the preset movement distance includes a first preset distance, and said upon movement of the wireless charging receiver in accordance with the preset moving direction and the preset movement distance, charging the wireless charging receiver at a position after the movement includes:

outputting a first prompt message, the first prompt message prompting the wireless charging receiver to move by the first preset distance in the first preset direction;

upon movement of the wireless charging receiver by the first preset distance in the first preset direction to a third position relative to the wireless charging transmitter, acquiring charging quality of the wireless charging receiver at the third position;

in a case where the charging quality at the third position is lower than the second charging quality, outputting a second prompt message, the second prompt message prompting the wireless charging receiver to move by the first preset distance in a second preset direction, the second preset direction being opposite to the first preset direction; and in a case where the charging quality at the third position is higher than the second charging quality, repeating the step of outputting the first prompt message and acquiring the charging quality, until the charging quality of the wireless charging receiver at the position after the movement by the first preset distance in the first preset direction is lower than the charging quality of the wireless charging receiver before the movement, and outputting the second prompt message.

Said upon movement of the wireless charging receiver in accordance with the preset moving direction and the preset movement distance, charging the wireless charging receiver at a position after the movement further includes:

upon movement of the wireless charging receiver by the first preset distance in the second preset direction, charging the wireless charging receiver at the position after the movement.

The preset moving direction further includes a third preset direction, the preset movement distance further includes a second preset distance, and the method further includes:

upon movement of the wireless charging receiver by the first preset distance in the second preset direction to a fourth position relative to the wireless charging transmitter, acquiring charging quality of the wireless charging receiver at the fourth position;

outputting a third prompt message, the third prompt message prompting the wireless charging receiver to move by the second preset distance in the third preset direction;

upon movement of the wireless charging receiver by the second preset distance in the third preset direction to a fifth position relative to the wireless charging transmitter, acquiring charging quality of the wireless charging receiver at the fifth position;

in a case where the charging quality at the fifth position is lower than the charging quality at the fourth position, outputting a fourth prompt message, the fourth prompt message prompting the wireless charging receiver to move by the second preset distance in a fourth preset direction, the fourth preset direction being opposite to the third preset direction; and in a case where the charging quality at the fifth position is higher than the charging quality at the fourth position, repeating the step of outputting the third prompt message and acquiring the charging quality, until the charging quality of the wireless charging receiver at the position after the movement by the second preset distance in the third preset direction is lower than the charging quality of the wireless charging receiver before the movement, and outputting the fourth prompt message.

Said charging the wireless charging receiver at a position after the movement includes:

upon movement of the wireless charging receiver by the second preset distance in the fourth preset direction, charging the wireless charging receiver at the position after the movement.

For the device in the above example, the specific manners in which various modules thereof operate have been described in detail in the example relating to the above method, and therefore will not be repeated herein.

Figure 15:
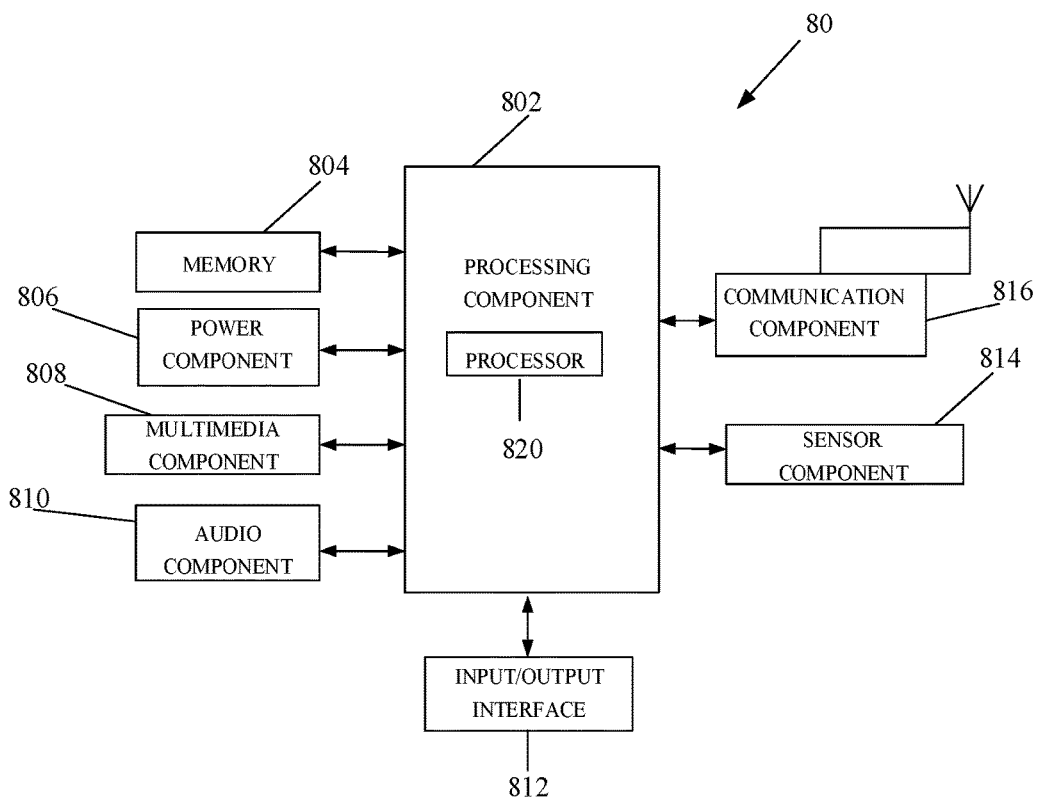
FIG. 15 is a block diagram showing a device 80 for controlling wireless charging according to an example.

FIG. 15 is a block diagram showing a device 80 for controlling wireless charging according to an example. The device 80 is applicable to a terminal device. For example, the device 80 may be a mobile phone, a computer, a digital broadcast terminal, a messaging device, a gaming console, a tablet, a medical device, exercise equipment, a personal digital assistant, and the like.

The device 80 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 80, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 80. Examples of such data include instructions for any applications or methods operated on the device 80, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 80. The power component 806 may include a power management system, one or more power sources, and any other components associated with the generation, management, and distribution of power in the device 80.

The multimedia component 808 includes a screen providing an output interface between the device 80 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 808 includes a front camera and/or a rear camera. The front camera and/or the rear camera may receive an external multimedia datum while the device 80 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 80 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 80. For instance, the sensor component 814 may detect an open/closed status of the device 80, relative positioning of components, e.g., the display and the keypad, of the device 80, a change in position of the device 80 or a component of the device 80, a presence or absence of user contact with the device 80, an orientation or an acceleration/deceleration of the device 80, and a change in temperature of the device 80. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 80 and other devices. The device 80 can access a wireless network based on a communication standard, such as WiFi, 2G, or 3G, or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module may be implemented based on a radio frequency identification (RFID) technology, an infra-red data association (IrDA) technology, an ultra-wideband (UWB) technology, a Bluetooth (BT) technology, and other technologies.

In examples, the device 80 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In examples, there is also provided a non-transitory computer-readable storage medium including instructions, such as included in the memory 804, executable by the processor 820 in the device 80, for performing the above described method. For example, the non-transitory computer-readable storage medium may be a ROM, a RAM, a CD-ROM, a magnetic tape, a floppy disc, an optical data storage device, and the like.

There is provided a non-transitory computer readable storage medium having stored thereon instructions that, when being executed by the device 80, enables the device 80 to perform the above method for controlling wireless charging. The method includes:

acquiring charging quality of a wireless charging receiver at a current position relative to a wireless charging transmitter, the charging quality including coupling signal intensity or charging efficiency;

upon movement of the wireless charging receiver from the current position to a first preset position relative to the wireless charging transmitter, acquiring charging quality of the wireless charging receiver at the first preset position relative to the wireless charging transmitter;

upon movement of the wireless charging receiver from the first preset position to a second preset position relative to the wireless charging transmitter, acquiring charging quality of the wireless charging receiver at the second preset position relative to the wireless charging transmitter;

determining relative position information of the wireless charging receiver relative to the wireless charging transmitter, based on the current charging quality at the current position, the first charging quality and the second charging quality;

acquiring position correction information of the wireless charging receiver corresponding to the relative position information; and upon correction of a position of the wireless charging receiver based on the position correction information, charging the wireless charging receiver at the corrected position.

Said determining relative position information of the wireless charging receiver relative to the wireless charging transmitter, based on the current charging quality at the current position, the first charging quality and the second charging quality includes:

determining a target quadrant of the wireless charging receiver in a preset rectangular coordinate system provided at the wireless charging transmitter, based on the current charging quality at the current position, the first charging quality and the second charging quality, an intersection of two axes of the preset rectangular coordinate system being a center of a charging coil in the wireless charging transmitter; and determining the relative position information, based on the target quadrant.

The position correction information includes a preset moving direction and a preset movement distance, and said upon correction of a position of the wireless charging receiver based on the position correction information, charging the wireless charging receiver at the corrected position includes:

upon movement of the wireless charging receiver in accordance with the preset moving direction and the preset movement distance, charging the wireless charging receiver at a position after the movement.

The preset moving direction includes a first preset direction, the preset movement distance includes a first preset distance, and said upon movement of the wireless charging receiver in accordance with the preset moving direction and the preset movement distance, charging the wireless charging receiver at a position after the movement comprises further includes:

outputting a first prompt message, the first prompt message prompting the wireless charging receiver to move by the first preset distance in the first preset direction;

upon movement of the wireless charging receiver by the first preset distance in the first preset direction to a third position relative to the wireless charging transmitter, acquiring charging quality of the wireless charging receiver at the third position;

in a case where the charging quality at the third position is lower than the second charging quality, outputting a second prompt message, the second prompt message prompting the wireless charging receiver to move by the first preset distance in a second preset direction, the second preset direction being opposite to the first preset direction; and in a case where the charging quality at the third position is higher than the second charging quality, repeating the step of outputting the first prompt message and acquiring the charging quality, until the charging quality of the wireless charging receiver at the position after the movement by the first preset distance in the first preset direction is lower than the charging quality of the wireless charging receiver before the movement, and outputting the second prompt message.

Said upon movement of the wireless charging receiver in accordance with the preset moving direction and the preset movement distance, charging the wireless charging receiver at a position after the movement further includes:

upon movement of the wireless charging receiver by the first preset distance in the second preset direction, charging the wireless charging receiver at the position after the movement.

The preset moving direction further includes a third preset direction, the preset movement distance further includes a second preset distance, and the method further includes:

upon movement of the wireless charging receiver by the first preset distance in the second preset direction to a fourth position relative to the wireless charging transmitter, acquiring charging quality of the wireless charging receiver at the fourth position;

outputting a third prompt message, the third prompt message prompting the wireless charging receiver to move by the second preset distance in the third preset direction;

upon movement of the wireless charging receiver by the second preset distance in the third preset direction to a fifth position relative to the wireless charging transmitter, acquiring charging quality of the wireless charging receiver at the fifth position;

in a case where the charging quality at the fifth position is lower than the charging quality at the fourth position, outputting a fourth prompt message, the fourth prompt message prompting the wireless charging receiver to move by the second preset distance in a fourth preset direction, the fourth preset direction being opposite to the third preset direction; and in a case where the charging quality at the fifth position is higher than the charging quality at the fourth position, repeating the step of outputting the third prompt message and acquiring the charging quality, until the charging quality of the wireless charging receiver at the position after the movement by the second preset distance in the third preset direction is lower than the charging quality of the wireless charging receiver before the movement, and outputting the fourth prompt message.

Said charging the wireless charging receiver at a position after the movement includes:

upon movement of the wireless charging receiver by the second preset distance in the fourth preset direction, charging the wireless charging receiver at the position after the movement.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof.

What is claimed is:

1. A method for controlling wireless charging, comprising:

acquiring a current charging quality of a wireless charging receiver at a current position relative to a wireless charging transmitter, the charging quality comprising charging efficiency, wherein the charging efficiency is determined based on a charging efficiency table using a preset rectangular coordinate system at the wireless charging transmitter;

acquiring a first charging quality of the wireless charging receiver at a first preset position relative to the wireless charging transmitter;

acquiring a second charging quality of the wireless charging receiver at a second preset position relative to the wireless charging transmitter;

determining relative position information of the wireless charging receiver relative to the wireless charging transmitter, based on the current charging quality at the current position, the first charging quality, and the second charging quality;

acquiring position correction information of the wireless charging receiver corresponding to the relative position information; and upon correction of a position of the wireless charging receiver based on the position correction information, charging the wireless charging receiver at the corrected position.

2. The method according to claim 1, wherein determining relative position information of the wireless charging receiver relative to the wireless charging transmitter, based on the current charging quality at the current position, the first charging quality and the second charging quality comprises:

determining a target quadrant of the wireless charging receiver in the preset rectangular coordinate system provided at the wireless charging transmitter, based on the current charging quality at the current position, the first charging quality and the second charging quality, an intersection of two axes of the preset rectangular coordinate system being a center of a charging coil in the wireless charging transmitter; and determining the relative position information, based on the target quadrant.

3. The method according to claim 1, wherein the position correction information comprises a preset moving direction and a preset movement distance, and upon correction of a position of the wireless charging receiver based on the position correction information, charging the wireless charging receiver at the corrected position comprises:

upon movement of the wireless charging receiver in accordance with the preset moving direction and the preset movement distance, charging the wireless charging receiver at a position after the movement.

4. The method according to claim 3, wherein the preset moving direction comprises a first preset direction, the preset movement distance comprises a first preset distance, and upon movement of the wireless charging receiver in accordance with the preset moving direction and the preset movement distance, charging the wireless charging receiver at a position after the movement comprises:
outputting a first prompt message, the first prompt message prompting the wireless charging receiver to move by the first preset distance in the first preset direction;
upon movement of the wireless charging receiver by the first preset distance in the first preset direction to a third position relative to the wireless charging transmitter, acquiring charging quality of the wireless charging receiver at the third position;
in a case where the charging quality at the third position is lower than the second charging quality, outputting a second prompt message, the second prompt message prompting the wireless charging receiver to move by the first preset distance in a second preset direction, the second preset direction being opposite to the first preset direction; and
in a case where the charging quality at the third position is higher than the second charging quality, repeating the step of outputting the first prompt message and acquiring the charging quality, until the charging quality of the wireless charging receiver at the position after the movement by the first preset distance in the first preset direction is lower than the charging quality of the wireless charging receiver before the movement, and outputting the second prompt message.

5. The method according to claim 4, wherein upon movement of the wireless charging receiver in accordance with the preset moving direction and the preset movement distance, charging the wireless charging receiver at a position after the movement further comprises:
upon movement of the wireless charging receiver by the first preset distance in the second preset direction, charging the wireless charging receiver at the position after the movement.

6. The method according to claim 4, wherein the preset moving direction further comprises a third preset direction, the preset movement distance further comprises a second preset distance, and the method further comprises:
upon movement of the wireless charging receiver by the first preset distance in the second preset direction to a fourth position relative to the wireless charging transmitter, acquiring charging quality of the wireless charging receiver at the fourth position;
outputting a third prompt message, the third prompt message prompting the wireless charging receiver to move by the second preset distance in the third preset direction;
upon movement of the wireless charging receiver by the second preset distance in the third preset direction to a fifth position relative to the wireless charging transmitter, acquiring charging quality of the wireless charging receiver at the fifth position;
in a case where the charging quality at the fifth position is lower than the charging quality at the fourth position, outputting a fourth prompt message, the fourth prompt message prompting the wireless charging receiver to move by the second preset distance in a fourth preset direction, the fourth preset direction being opposite to the third preset direction; and
in a case where the charging quality at the fifth position is higher than the charging quality at the fourth position, repeating the step of outputting the third prompt message and acquiring the charging quality, until the charging quality of the wireless charging receiver at the position after the movement by the second preset distance in the third preset direction is lower than the charging quality of the wireless charging receiver before the movement, and outputting the fourth prompt message;
wherein charging the wireless charging receiver at a position after the movement comprises:
upon movement of the wireless charging receiver by the second preset distance in the fourth preset direction, charging the wireless charging receiver at the position after the movement.

7. A device for controlling wireless charging, comprising:
a processor; and
a memory for storing instructions executable by the processor, wherein the processor is configured to:
acquire a current charging quality of a wireless charging receiver at a current position relative to a wireless charging transmitter, the charging quality comprising charging efficiency, wherein the charging efficiency is determined based on a charging efficiency table using a preset rectangular coordinate system at the wireless charging transmitter;
acquire a first charging quality of the wireless charging receiver at a first preset position relative to the wireless charging transmitter;
acquire a second charging quality of the wireless charging receiver at a second preset position relative to the wireless charging transmitter;
determine relative position information of the wireless charging receiver relative to the wireless charging transmitter, based on the current charging quality at the current position, the first charging quality, and the second charging quality;
acquire position correction information of the wireless charging receiver corresponding to the relative position information; and
upon correction of a position of the wireless charging receiver based on the position correction information, charge the wireless charging receiver at the corrected position.

8. The device according to claim 7, wherein the processor is further configured to:
determine a target quadrant of the wireless charging receiver in the preset rectangular coordinate system provided at the wireless charging transmitter, based on the current charging quality at the current position, the first charging quality and the second charging quality, an intersection of two axes of the preset rectangular coordinate system being a center of a charging coil in the wireless charging transmitter; and
determine the relative position information, based on the target quadrant.

9. The device according to claim 7, wherein the position correction information comprises a preset moving direction and a preset movement distance, and the processor is further configured to:
upon movement of the wireless charging receiver in accordance with the preset moving direction and the preset movement distance, charge the wireless charging receiver at a position after the movement.

10. The device according to claim 9, wherein the preset moving direction comprises a first preset direction, the preset movement distance comprises a first preset distance, and the processor is further configured to:
output a first prompt message, the first prompt message prompting the wireless charging receiver to move by the first preset distance in the first preset direction;
upon movement of the wireless charging receiver by the first preset distance in the first preset direction to a third position relative to the wireless charging transmitter, acquire charging quality of the wireless charging receiver at the third position;

in a case where the charging quality at the third position is lower than the second charging quality, output a second prompt message, the second prompt message prompting the wireless charging receiver to move by the first preset distance in a second preset direction, the second preset direction being opposite to the first preset direction; and in a case where the charging quality at the third position is higher than the second charging quality, repeat the step of outputting the first prompt message and acquiring the charging quality, until the charging quality of the wireless charging receiver at the position after the movement by the first preset distance in the first preset direction is lower than the charging quality of the wireless charging receiver before the movement, and output the second prompt message.

11. The device according to claim 10, wherein the processor is further configured to:

upon movement of the wireless charging receiver by the first preset distance in the second preset direction, charge the wireless charging receiver at the position after the movement.

12. The device according to claim 10, wherein the preset moving direction further comprises a third preset direction, the preset movement distance further comprises a second preset distance, the processor is further configured to:

upon movement of the wireless charging receiver by the first preset distance in the second preset direction to a fourth position relative to the wireless charging transmitter, acquire charging quality of the wireless charging receiver at the fourth position;

output a third prompt message, the third prompt message prompting the wireless charging receiver to move by the second preset distance in the third preset direction;

upon movement of the wireless charging receiver by the second preset distance in the third preset direction to a fifth position relative to the wireless charging transmitter, acquire charging quality of the wireless charging receiver at the fifth position;

in a case where the charging quality at the fifth position is lower than the charging quality at the fourth position, output a fourth prompt message, the fourth prompt message prompting the wireless charging receiver to move by the second preset distance in a fourth preset direction, the fourth preset direction being opposite to the third preset direction; and in a case where the charging quality at the fifth position is higher than the charging quality at the fourth position, repeat the step of outputting the third prompt message and acquiring the charging quality, until the charging quality of the wireless charging receiver at the position after the movement by the second preset distance in the third preset direction is lower than the charging quality of the wireless charging receiver before the movement, and output the fourth prompt message; and wherein the processor, configured to charge the wireless charging receiver at a position after the movement, is further configured to:

upon movement of the wireless charging receiver by the second preset distance in the fourth preset direction, charge the wireless charging receiver at the position after the movement.

13. A non-transitory computer readable storage medium having stored thereon computer instructions that, when being executed by a processor, causing the processor to perform acts comprising:

acquiring a current charging quality of a wireless charging receiver at a current position relative to a wireless charging transmitter, the charging quality comprising charging efficiency, wherein the charging efficiency is determined based on a charging efficiency table using a preset rectangular coordinate system at the wireless charging transmitter;

acquiring a first charging quality of the wireless charging receiver at a first preset position relative to the wireless charging transmitter;

acquiring a second charging quality of the wireless charging receiver at a second preset position relative to the wireless charging transmitter;

determining relative position information of the wireless charging receiver relative to the wireless charging transmitter, based on the current charging quality at the current position, the first charging quality, and the second charging quality;

acquiring position correction information of the wireless charging receiver corresponding to the relative position information; and upon correction of a position of the wireless charging receiver based on the position correction information, charging the wireless charging receiver at the corrected position.

14. The non-transitory computer readable storage medium according to claim 13, wherein determining relative position information of the wireless charging receiver relative to the wireless charging transmitter, based on the current charging quality at the current position, the first charging quality and the second charging quality comprises:

determining a target quadrant of the wireless charging receiver in the preset rectangular coordinate system provided at the wireless charging transmitter, based on the current charging quality at the current position, the first charging quality and the second charging quality, an intersection of two axes of the preset rectangular coordinate system being a center of a charging coil in the wireless charging transmitter; and determining the relative position information, based on the target quadrant.

15. The non-transitory computer readable storage medium according to claim 13, wherein the position correction information comprises a preset moving direction and a preset movement distance, and upon correction of a position of the wireless charging receiver based on the position correction information, charging the wireless charging receiver at the corrected position comprises:

upon movement of the wireless charging receiver in accordance with the preset moving direction and the preset movement distance, charging the wireless charging receiver at a position after the movement.

16. The non-transitory computer readable storage medium according to claim 15, wherein the preset moving direction comprises a first preset direction, the preset movement distance comprises a first preset distance, and upon movement of the wireless charging receiver in accordance with the preset moving direction and the preset movement distance, charging the wireless charging receiver at a position after the movement comprises:

outputting a first prompt message, the first prompt message prompting the wireless charging receiver to move by the first preset distance in the first preset direction;

upon movement of the wireless charging receiver by the first preset distance in the first preset direction to a third position relative to the wireless charging transmitter, acquiring charging quality of the wireless charging receiver at the third position;

in a case where the charging quality at the third position is lower than the second charging quality, outputting a second prompt message, the second prompt message prompting the wireless charging receiver to move by the first preset distance in a second preset direction, the second preset direction being opposite to the first preset direction; and in a case where the charging quality at the third position is higher than the second charging quality, repeating the step of outputting the first prompt message and acquiring the charging quality, until the charging quality of the wireless charging receiver at the position after the movement by the first preset distance in the first preset direction is lower than the charging quality of the wireless charging receiver before the movement, and outputting the second prompt message.

17. The non-transitory computer readable storage medium according to claim 16, wherein upon movement of the wireless charging receiver in accordance with the preset moving direction and the preset movement distance, charging the wireless charging receiver at a position after the movement further comprises:

upon movement of the wireless charging receiver by the first preset distance in the second preset direction, charging the wireless charging receiver at the position after the movement.

18. The non-transitory computer readable storage medium according to claim 16, wherein the preset moving direction further comprises a third preset direction, the preset movement distance further comprises a second preset distance, and wherein when being executed by the processor, the instructions further implement the steps of:

upon movement of the wireless charging receiver by the first preset distance in the second preset direction to a fourth position relative to the wireless charging transmitter, acquiring charging quality of the wireless charging receiver at the fourth position;

outputting a third prompt message, the third prompt message prompting the wireless charging receiver to move by the second preset distance in the third preset direction;

upon movement of the wireless charging receiver by the second preset distance in the third preset direction to a fifth position relative to the wireless charging transmitter, acquiring charging quality of the wireless charging receiver at the fifth position;

in a case where the charging quality at the fifth position is lower than the charging quality at the fourth position, outputting a fourth prompt message, the fourth prompt message prompting the wireless charging receiver to move by the second preset distance in a fourth preset direction, the fourth preset direction being opposite to the third preset direction; and in a case where the charging quality at the fifth position is higher than the charging quality at the fourth position, repeating the step of outputting the third prompt message and acquiring the charging quality, until the charging quality of the wireless charging receiver at the position after the movement by the second preset distance in the third preset direction is lower than the charging quality of the wireless charging receiver before the movement, and outputting the fourth prompt message;

wherein charging the wireless charging receiver at a position after the movement comprises:

upon movement of the wireless charging receiver by the second preset distance in the fourth preset direction, charging the wireless charging receiver at the position after the movement.

19. The method according to claim 1, further comprising displaying, at a first position on a screen, a first pattern indicating the current position of the wireless charging receiver; and a second pattern, at a second position on the screen, indicating a target position based on the position correction information; wherein during movement of the wireless charging receiver, display of the current position and the second position is adjusted in real time.

20. The method according to claim 1, further comprising displaying an overlapping pattern of the first pattern and the second pattern upon detecting that the wireless charging receiver is moved to the target position.

* * * * *